United States Patent [19]

Jacobson et al.

[11] Patent Number: 4,647,253
[45] Date of Patent: Mar. 3, 1987

[54] CABLE TURNTABLE ASSEMBLY

[75] Inventors: Alan R. Jacobson; Larry D. Sund, both of King County, Wash.

[73] Assignee: Jacobson Brothers, Inc., Seattle, Wash.

[21] Appl. No.: 787,649

[22] Filed: Oct. 16, 1985

[51] Int. Cl.$^4$ .......................... F16L 1/04; B60V 1/00
[52] U.S. Cl. .................................. 405/168; 180/124; 254/134.3 SC; 384/100; 384/121; 384/12
[58] Field of Search ...................... 405/168, 158, 154; 242/129; 254/134.3 SC; 114/259, 254; 180/124, 125; 308/5 R; 384/100, 121, 99

[56] References Cited

U.S. PATENT DOCUMENTS

| | | | |
|---|---|---|---|
| 3,093,333 | 6/1963 | Bishop | 254/134.3 SC X |
| 3,372,461 | 3/1968 | Tesson | 405/168 |
| 3,618,694 | 11/1971 | Crowley et al. | 180/124 |
| 3,630,461 | 12/1971 | Sagasti | 405/168 X |
| 3,680,342 | 8/1972 | Mott et al. | 405/168 X |
| 3,744,734 | 7/1973 | Lodato et al. | 242/129 |
| 3,950,038 | 4/1976 | Wood | 180/125 |
| 4,260,287 | 4/1981 | Uyeda et al. | 405/168 |
| 4,470,578 | 9/1984 | Arvidsson et al. | 180/125 |

FOREIGN PATENT DOCUMENTS 932302  7/1963  United Kingdom ...... 254/134.3 SC

*Primary Examiner*—Cornelius J. Husar
*Assistant Examiner*—Todd G. Williams
*Attorney, Agent, or Firm*—Seed and Berry

[57] ABSTRACT

A large capacity, cable turntable assembly is provided for use in connection with laying along lengths of underwater cable. A turntable is provided which has a planar, toroidal floor bounded by an upright, interior wall surrounding the axis of rotation and an upright, exterior wall spaced apart from the interior wall. The walls and floor define an open-top chamber for receiving a long, coiled length of cable. A multiplicity of fluid-cushion bearings are secured to the turntable below the floor and permit rotation of the turntable on a supporting surface when the turntable is loaded with cable and when the cable is removed. The fluid-cushion bearings also permit lateral movement of the turntable over distances. Water is supplied under pressure to the bearings to facilitate movement of the turntable. The turntable may be positioned on a shoreside-support, permitting rotation of the turntable in order to load cable onto the turntable. The turntable may then be moved laterally onto a support surface on a floating platform, such as a barge. During the loading process, the barge is ballasted to maintain a level attitude. When the turntable is on the barge, the central core, which forms a lateral bearing surface, is positioned in the center of the turntable. In order to permit the lateral movement of the turntable, the central core may be either recessed into the deck or made removable. The turntable is driven by peripheral drive wheels.

8 Claims, 12 Drawing Figures

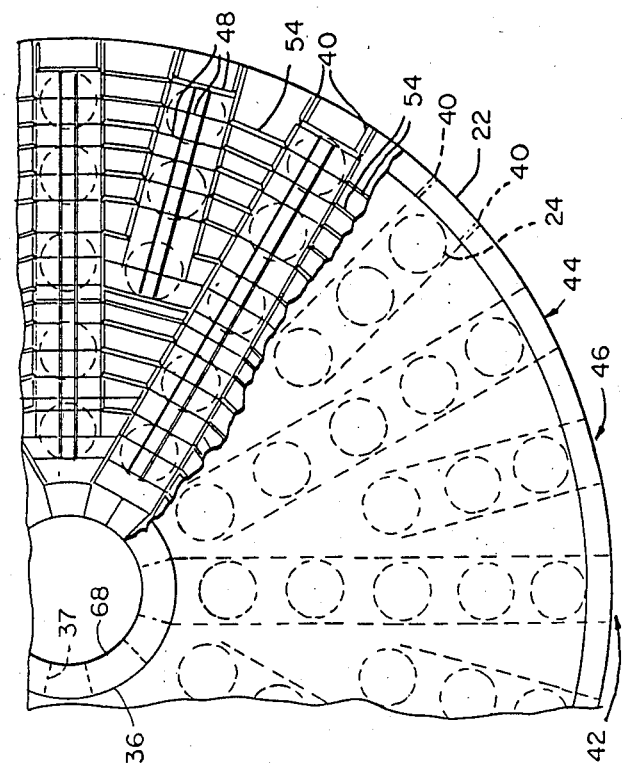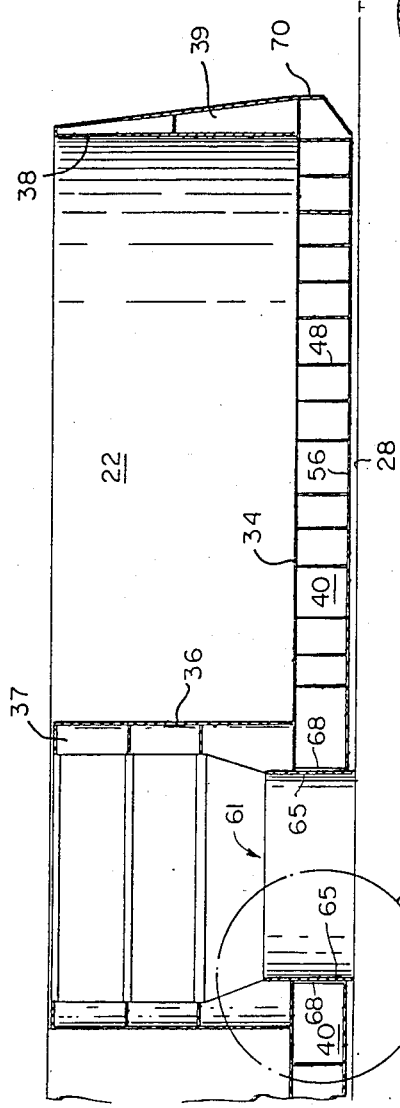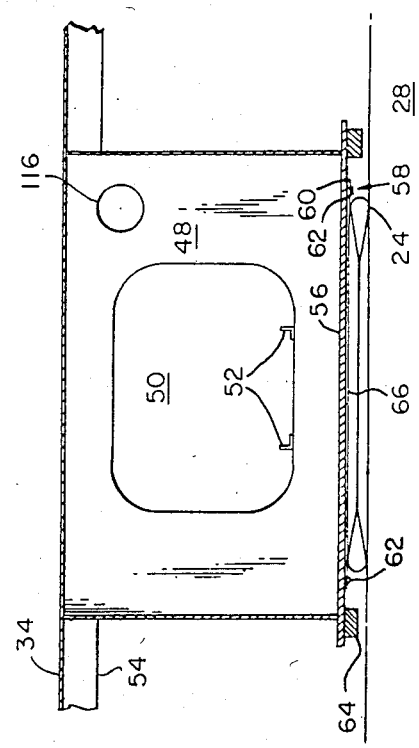

4,647,253

CABLE TURNTABLE ASSEMBLY

TECHNICAL FIELD

The invention relates to a large-capacity, cable turntable assembly of the type used in connection with laying long lengths of underwater cable.

BACKGROUND ART

In the process of laying long lengths of double armored underwater cable from a floating platform, the cable has been typically stored on reels. There is a significant advantage in utilizing long lengths of cable in that it avoids interrupting the laying process to make splices in the cable. A disadvantage of using long lengths of cable is the weight of the cable itself. In the past, it has been difficult to handle long lengths of double armored, contrahelic cable, particularly lengths ranging on the order of 3000 m and longer, and weighing 150 tons and more.

DISCLOSURE OF INVENTION

A large capacity, cable turntable assembly is provided for use in connection with laying long lengths of underwater cable.

A turntable is provided which has a planar, toroidal floor bounded by an upright, interior wall surrounding the axis of rotation and an upright, exterior wall spaced apart from the interior wall. The walls and floor define an open-top chamber for receiving a long, coiled length of cable.

A multiplicity of fluid-cushion bearings are secured to the turntable below the floor and permit rotation of the turntable on a supporting surface when the turntable is loaded with cable and when the cable is removed. The fluid-cushion bearings also permit lateral movement of the turntable over distances. Water is supplied under pressure to the bearings to facilitate movement of the turntable.

The turntable may be positioned on a shoreside-support permitting rotation of the turntable in order to load cable onto the turntable. The turntable may then be moved laterally onto a support surface on a floating platform, such as a barge. During the loading process the barge is ballasted to maintain a level attitude. When the turntable is on the barge, the central core, which forms a lateral bearing surface, is positioned in the center of the turntable. In order to permit the lateral movement of the turntable, the central core may be either recessed into the deck or made removable.

The turntable is driven by peripheral drive wheels.

A cable feed and slack take-up assembly is provided in order to guide the cable when loading or unloading the turntable; as well as, to provide for the take-up or provision of slack necessitated by the differential rates in speed of the turntable and cable feeding equipment during start-up and shutdown.

BRIEF DESCRIPTION OF THE DRAWINGS

FIG. 4 is an enlarged partial, top plan view, with parts broken away, of the turntable drum.

FIG. 5 is an enlarged, partial, sectional view taken through the center of the turntable drum and core.

FIG. 6 is a transverse sectional view through a support bearing, a girder pair and the floor of the turntable drum.

BEST MODE FOR CARRYING OUT THE INVENTION

The invention relates to a large-capacity, cable turntable assembly of the type used in connection with laying long lengths of underwater cable.

Figure 1:
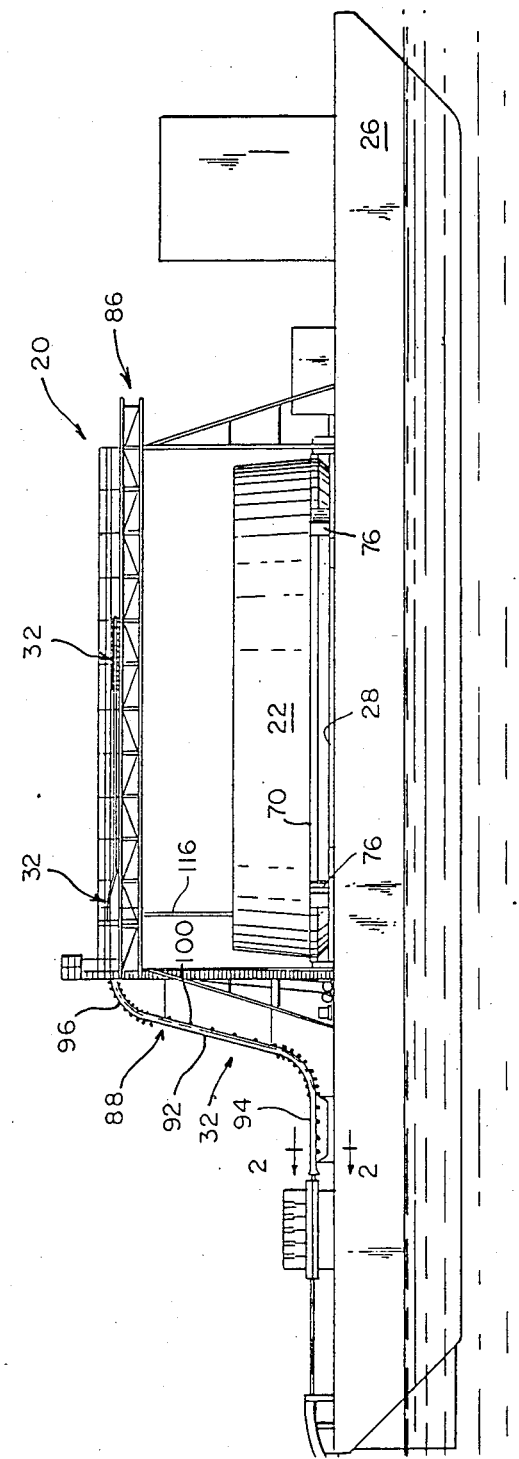
FIG. 1 is a side elevational view of a barge carrying the preferred embodiment of the turntable assembly for use in laying long lengths of underwater cable.
Figure 3:
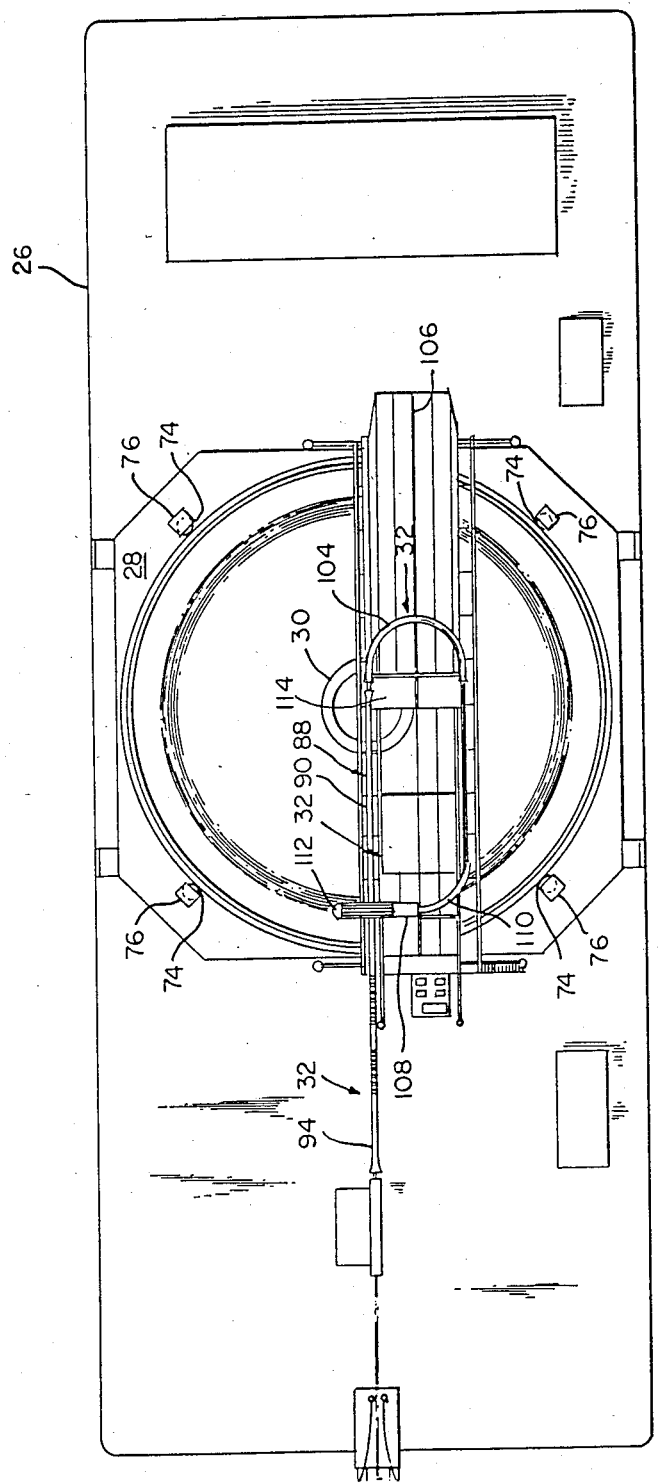
FIG. 3 is a top plan view of the embodiment of the turntable assembly shown in FIG. 1, with the turntable shown in phantom.

The turntable assembly 20, shown in FIGS. 1 and 3, includes a turntable drum 22 in which the cable is coiled for storage and which is rotated in one direction during the process of loading cable and rotated in the opposite direction when the cable is being removed. The drum is supported on bearings 24 shown in FIGS. 5 and 6, preferably of the fluid type, for rotation during the loading and unloading process and for lateral movement of the turntable over flat surfaces and on and off a floating platform or other conveyance. The bearings permit the turntable to be loaded with cable at a shoreside facility and then to be slid onto a floating platform, such as a barge 26, on which the assembly may be transported to a cable laying site and from which the cable may be dispensed during the laying operation. The floating platform, or barge, is provided with a deck pad 28 on which the turntable is supported. Centrally located in the deck pad is a removable core 30 which forms a central bearing about which the turntable rotates and which holds the turntable in position. See FIGS. 5 and 7. The core structure is removable or recessed into the deck of the barge in order to permit the turntable to be moved into place and removed. A cable feed and slack take-up assembly 32 is provided on the floating platform in order to guide the cable when loading or unloading the turntable as well as to provide for the take-up and provision of slack necessitated by the differential rates in speed of the turntable and cable feed equipment during start-up and shutdown.

The preferred embodiment of the invention will be described in terms of a turntable having a capacity of approximately 4,000 tons, a volume of 420 m$^2$, and a capacity of approximately 48 km of 160-mm diameter cable. This example is merely intended to be illustrative, and the parameters recited will vary in accordance with the specific application.

In the preferred embodiment, the turntable drum has a planar toroidal floor 34 as shown in FIGS. 4 and 5. In the example, the floor is of 10-mm sheet steel. A cylindrical inner bulkhead 36 is placed around the central floor opening, and in our example, has a 2.5 m radius. See FIG. 5. The interior bulkhead 36 is reinforced in a similar manner by vertical reinforcement members 37. An outer cylindrical bulkhead 38 extends around the outer edge surface of the floor, and in our example, has a 12 m radius. The outer bulkhead of the turntable is supported by vertical stiffeners 39 extending upwardly from the ends of the girders, described below. In order to stiffen the turntable structure and to support the very large loads, reinforcing, such as the pairs of radially directed plate girders 40, extends beneath the deck plate. See FIG. 4. Preferably, the girders are formed in parallel, radially aligned pairs defining six primary bearing row girder pairs 42, six secondary bearing row girder pairs 44, and twelve tertiary bearing row girder pairs 46 spaced at 15-degree intervals. Transverse framing plates 48 extend between the pairs of girders. See FIG. 6. In our example, the girders are of 8-mm steel plate, 900-mm deep and spaced 1500 mm apart. The transverse framing is provided with centrally aligned openings 50 forming an access path along the center of the bearing rows. A creeper track 52 may be provided along the base of the aligned openings on which personnel may slide on a wheeled creeper in order to service the bearings described below. Additional framing 54 is provided between adjacent girder pairs. Bearing support plates 56 are secured to the bottom of the girder pairs. In our example, the plates are of 25-mm sheet steel. Receiving channels 58 are provided along the central portion of the bearing support plates for receiving the bearing backing plates 66 described below. These channels may be formed, such as by the use of a pair of spaced strips of flat bar 60 secured to the underside of the bearing support plates with an additional pair of spaced flat bar strips 62 projecting inwardly, with each secured to the corresponding piece of flat bar above. Bearing landing pads 64 are provided which extend below the bearing support plates and receiving channels 58. The landing pads are preferably formed of elongated strips of an ultrahigh molecular weight synthetic bearing material and extend below the web of the girders and on either side of the bearing rows. In our example, the ultrahigh molecular weight pads are 150 mm wide and 50 mm thick.

The fluid bearings are secured to the bearing support plates 56 by sliding their backing sheets 66 along the channels 58 formed on the bottom of the bearing support plates. The bearings used are of the fluid type, preferably water bearings (such as Aero-Go, Inc., Model No. 48NHW, Aero-Casters brand bearings each having a 40-ton capacity and made by Aero-Go, Inc., of Seattle, Wash., U.S.A.). The bearings are generally toroidal in shape and of the general type illustrated in U.S. Pat. No. 3,618,694. Fluid under pressure is pumped into their centers and allowed to escape beneath the outer edges of the toroidal structure. The bearings collapse when fluid under pressure is no longer being supplied to them, such that the turntable is then supported on the bearing landing pads 64. In the illustrated example, there are a total of ninety-six bearings in six primary rows of five bearings, six secondary rows of five bearings, and twelve tertiary rows of three bearings. The bearing rows are spaced radially at 15-degree intervals. Depending on the loads to be encountered on a specific application, not all bearings need to be installed for any given project.

A drive wheel surface 70 is shown in FIG. 5 and is provided along the lower periphery of the outside of the turntable drum. This surface is engaged frictionally by the drive wheels described below. In our example, it is formed by a 500-mm wide steel band of 12.600M outer radius. The surface is coated with a high-grip, nonskid coating, such as PRC Phoreco III by Products Research & Chemical Company, Seattle, Wash., U.S.A.

A lateral, central bearing surface in the form of a cylindrical plate 68 is provided in the lower interior of the central opening of the turntable. This forms a bearing surface which engages the core bearing described below. In our example, the central bearing surface is in the form of a cylinder of 40-mm steel having an interior radius of 1730 mm+/−6 mm. The bearing surface of the turntable is provided with a horizontal bearing stop 71 which extends circumferentially around the lower portion of the bearing surface. See FIG. 7. Vertical bearing guides 67 extend upward at spaced intervals around the wall of the bearing surface. See FIG. 8. The bearing stop and bearing guides define generally rectangular slots in which sheets of bearing material 69 are slid. The bearing material is held in place by the bearing guides and bearing stops and between the exterior wall of the core described below and the interior bearing wall 68 of the turntable. The bearing material is preferably ultrahigh molecular weight synthetic bearing material trimmed to conform to the curvature of the wall that it contacts. In our example, the ultrahigh molecularweight bearing sheets are 300 mm wide, 1200 mm high and 50 mm thick.

Figure 11:
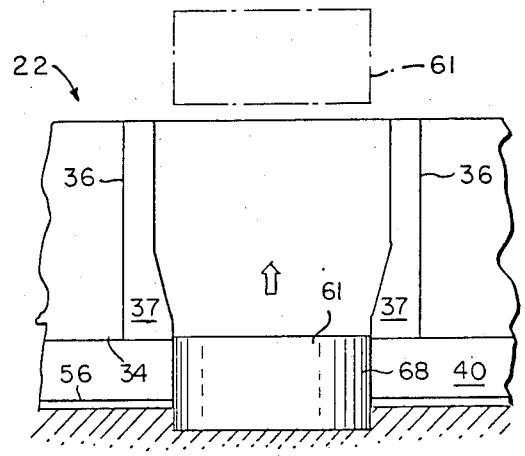
FIG. 11 is a schematic diagram of the turntable and a removable core.
Figure 12:
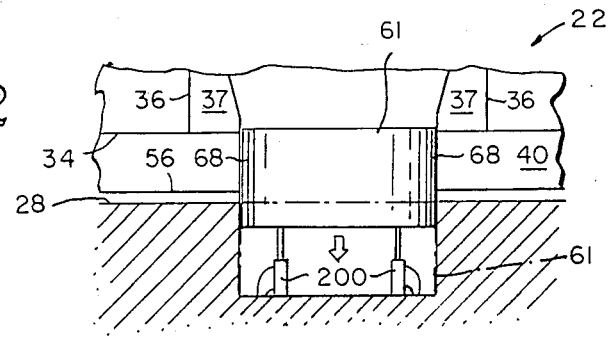
FIG. 12 is a schematic diagram of the turntable and a core recessable in the deck.

A central core 61 is positioned in the center of the deck pad. In the preferred embodiment, the central core has a central cylindrical interior wall 63 and a concentric outer wall 65. Radial and horizontal webbing braces are provided between the inner wall and outer wall. In our example, the outer wall is of 25-mm steel plate with an interior radius of 1650 mm+/−3 mm. The outer wall is covered with a smooth-surfaced liner 59, in our example, a sheet of 6-mm stainless steel. The core is removeable as shown in FIG. 12 by any conventional means such as a crane or capable of being recessed into the deck with its top at the level of the deck pad by any conventional means such as double acting hydraulic cylinders 200. See FIGS. 11 and 12.

Figure 7:
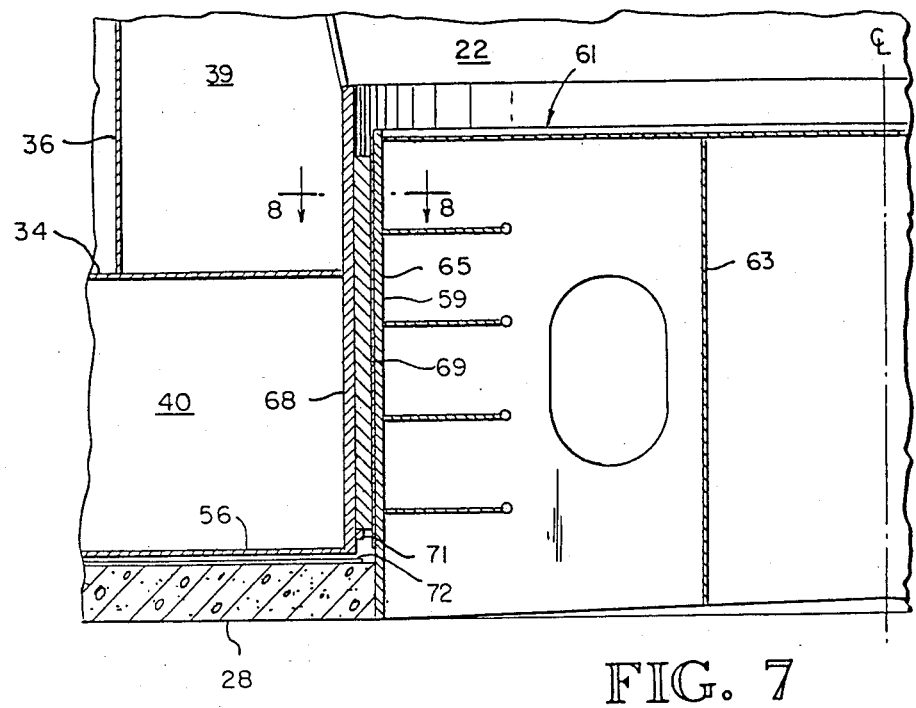
FIG. 7 is a greatly enlarged, transverse sectional view taken from the area designated in FIG. 5 showing the transverse cross section of the core, core bearing, and adjacent drum structure.
Figure 8:
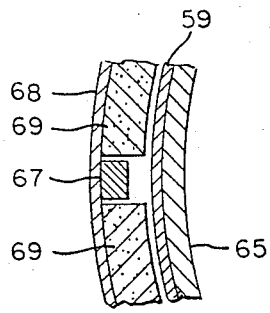
FIG. 8 is an enlarged sectional view taken along line 8—8 from FIG. 7.

The deck pad 28 shown is FIG. 7 is in the form of a reinforced concrete pad positioned centrally with respect to the barge and covered with a sheet steel plate 72, such as a 6-mm plate in our example, in order to provide a smooth surface.

Figure 9:
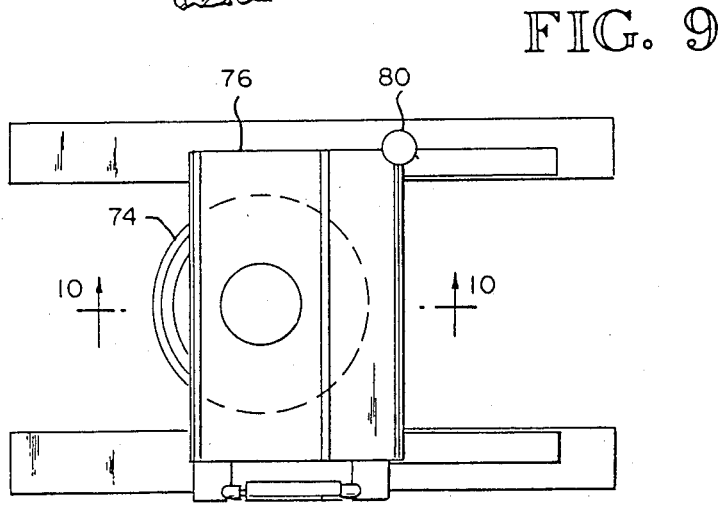
FIG. 9 is a top plan view of a drum drive wheel and stand.
Figure 10:
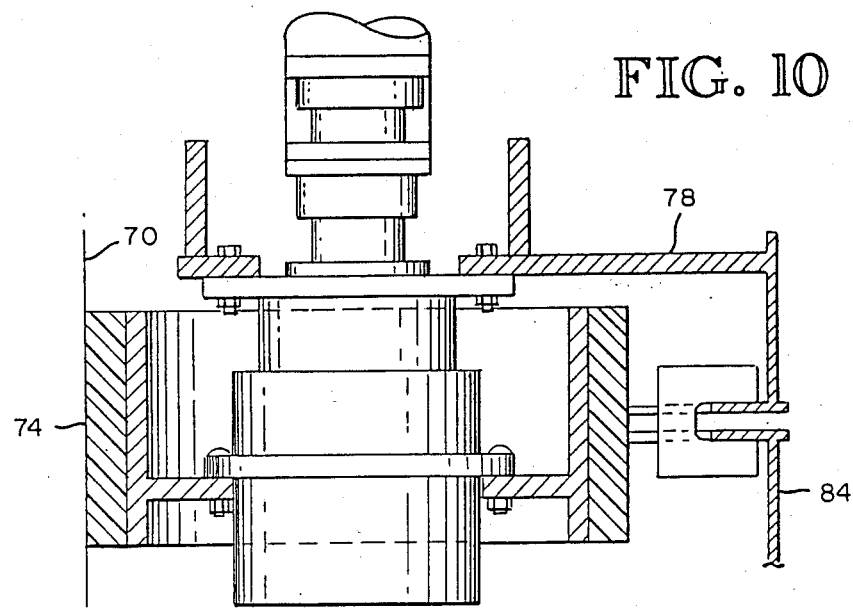
FIG. 10 is an enlarged sectional view through the top of the drive wheel and stand taken along the line 10—10 of FIG. 9.

The turntable drive preferably takes the form of four radially positioned, powered drive wheels 74 spaced about the perimeter of the turntable. The drives are preferably mounted on securely positioned, removeable stands 76. See FIG. 9. The upper sections 78 of the stands in FIG. 10 are mounted for pivotal movement about one corner 80 shown in FIG. 9. The drive wheels are mounted with their axis of rotation in a vertical position, with the drive motor and gear unit above. See FIG. 10. The drive wheels are preferably in the form of smooth-surfaced, wide-track wheels, like those found on fork-lift trucks. They have a thick, resilient exterior surface of a hard, resilient, rubber-like material, such as 25-mm thick, 70-durometer polyurethane. The drive wheels are rigidly mounted to the upper section of the stands. A braking system is provided, such as a shaft brake. Hydraulic cylinders 82 secured between the base 84 of the stand and the upper pivoting portion of the stand are used to apply a load force between the frictional drive wheel and the friction surface on the exterior of the turntable. An ultrahigh molecular weight synthetic plastic or other bearing material is preferably provided between the sliding surfaces between the upper and lower sections of the stand. In the illustrative example, each of the four drive units provides 140,000 inch-pounds of torque at a turntable speed of one revolution/minute.

Figure 2:
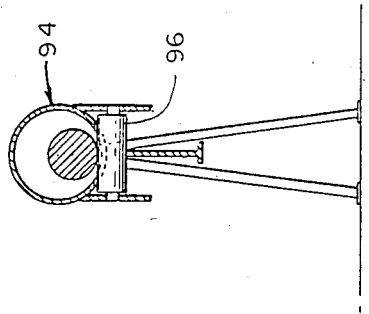
FIG. 2 is a sectional view taken along line 2—2 from FIG. 1, illustrating the deck run of the cable feed pipe.

A gantry 86 extends over the top of the turntable. See FIGS. 1 and 3. The gantry supports a cable feed pipe 88 having an elevated run 90, a descending run 92, and a deck level run 94. Rollers 96 are preferably provided and extend through openings in the surface of the curved section between the elevated run and the descending run to reduce cable friction. These rollers are preferably spaced at 250-mm center-line-to-center-line spacings. The descending run is preferably sloped and has rollers 98 spaced along one side of 1000-mm spacings. The curved portion of the cable feed pipe between the descending run and the deck run also is provided with rollers 100, top and bottom. See FIG. 2. The radius of curvature of the bends is preferably maintained at 2500 mm. Rollers 102 are provided at spaced intervals along the bottom of the deck run.

The gantry additionally supports a 180-degree cable return guide 104 mounted on a reciprocating take-up cart and supported for movement on bearing strips 106, such as the ultrahigh molecular weight synthetic plastic wear strips 106.

A cable return guide 108 is provided which has a 90-degree horizontal bend 110 and a 90-degree leg 112. The cable return guide is mounted on a reciprocating cable coiling cart 114.

The cable is stored in the turntable in horizontal layers created by coiling the cable as the turntable is turned while the cable discharge point from the down leg on the cable return guide is moved back and forth between the interior and exterior walls of the turntable. During this operation, the coiling cart is moved under the action of a conventional control system while the cable take-up cart is moved in and out to take up and provide slack during start-up and shutdown of the cable-handling equipment.

A barge capable of supporting the turntable of the type used in the illustrative example would be approximately 85 m long, 28 m wide and 6 m in depth.

Filtered seawater is fed to the bearings from a flexible connection 116 extending from the gantry into the vertical, central distribution header in the core. A rotating joint is provided between the distribution header and the seawater feed connection connected to the gantry. Radial feed lines distribute water to the water bearings.

The cable may be installed in the drum at a shore-based facility. In order to remove the drum from the barge, the central core is either detached from its connection to the barge or recessed into the deck of the barge. The water is supplied to the bearings by connecting flexible connection 116 to an alternate source of supply in order to permit movement of the drum. The drive wheel stands along one side of the drum are removed. The turntable is then moved with its weight supported by the fluid bearings from the deck of the barge to the shoreside platform at substantially the same elevation. The barge is ballasted to prevent tipping of the barge during the off-loading process in order to maintain a substantially horizontal support surface for the turntable. The process is reversed to move the full turntable drum back onto the barge.

While this invention has been described in conjunction with a specific embodiment of the large-capacity, cable turntable assembly as used in connection with laying long lengths of underwater cable, it should be understood that the apparatus described and the method described in connection with its use are merely illustrative. Numerous modifications and alterations may be made to the device and its use without departing from the spirit and scope of the invention, and it is intended that the patent shall cover whatever features of patentable novelty exist in the invention and are encompassed within the following claims.

We claim:

1. A cable turntable assembly for use in storing and laying long lengths of cable, comprising:
   (a) a turntable suitable for rotation about a central vertical axis, the turntable having an interior upright wall surrounding the axis of rotation, an exterior upright wall spaced from and exterior to the interior wall, and a floor, with the walls and floor defining an open-topped chamber for receiving a long, coiled length of cable;
   (b) a turntable support surface for use in supporting the turntable for rotational movement;
   (c) a multiplicity of fluid-cushioned bearings secured to the turntable below the floor in an array to permit rotation of the turntable on the support surface when the turntable is loaded with cable and when cable is removed permitting lateral movement of the turntable over distances;
   (d) means for supplying fluid to the bearings to facilitate movement of the turntable;
   (e) means for securing the turntable against lateral movement while permitting rotational movement; and
   (f) means for rotating the turntable to facilitate the deposit of cable to and removal of cable from the turntable.

2. A cable turntable assembly, as claimed in claim 1, wherein the turntable lateral movement securement means includes means for selectively securing the turntable against lateral movement.

3. A cable turntable assembly, as claimed in claim 1, wherein the turntable includes a central opening and wherein the turntable assembly further includes a central projection extending upward from a location central with respect to the turntable support surface and which is closely received in the hole in the turntable to secure the turntable against lateral movement.

4. A cable turntable assembly, as claimed in claim 3, wherein the central projection is releasably secured with respect to the turntable when the central core is released from its connection to the support surface.

5. A turntable assembly, as claimed in claim 3, wherein the turntable support surface is located on a floating platform.

6. A cable turntable assembly, as claimed in claim 5, wherein the turntable support surface further comprises a second surface positioned on land and adjacent to which the floating platform may be positioned to permit lateral movement of the turntable to and from the floating platform.

7. A turntable assembly, as claimed in claim 4, wherein the turntable lateral movement securement means includes means for selectively securing the turntable against lateral movement.

8. A method of providing cable in long lengths for underwater cable-laying operations, comprising the steps of:

(a) coiling the cable in a drum on shore;

(b) supporting the drum on a fluid bearing;

(c) placing the cable drum on a support surface adjacent to water;

(d) Placing a floating platform having a surface for supporting the cable drum adjacent to the cable drum on the support surface adjacent to water;

(e) moving the cable drum laterally on the fluid bearings onto the floating platform; and (f) securing the cable drum against lateral movement while permitting rotational movement of the drum; and (g) rotating the drum on the floating platform to dispense the cable.

* * * * *